3,383,699
ELECTROSTATIC RECORDER WITH DRIVE
SYSTEM INCLUDING FEEDBACK MEANS
Francis A. Lapinski, Ambler, Pa., assignor to Honeywell
Inc., a corporation of Delaware
Filed Nov. 25, 1964, Ser. No. 413,754
6 Claims. (Cl. 346—74)

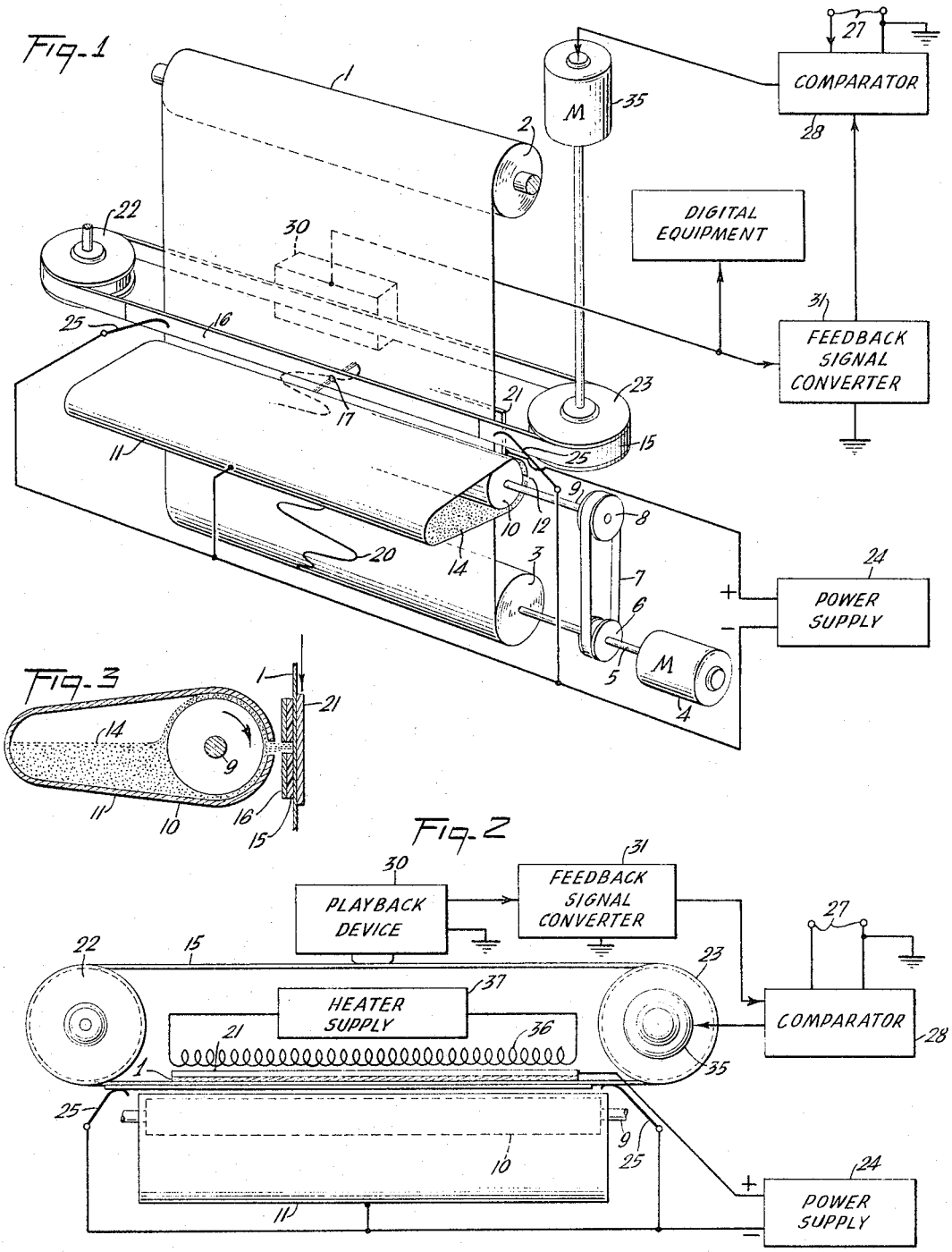

This invention relates to recorder apparatus. More specifically, the present invention relates to electrostatic recording and a means for providing an electrical feedback therefore.

An object of the present invention is to provide an improved electrostatic recorder for variable magnitude input signals.

Another object of the present invention is to provide an improved electrostatic recorder having a feedback reference signal generating means.

A further object of the present invention is to provide an electrostatic strip chart recorder having a combined recording element and a feedback signal generating means.

Another further object of the present invention is to provide an electrostatic recording having a low inertia high speed recording element with an inherent analog to digital conversion of a recorded signal.

Still another further object of the present invention is to provide an electrostatic recording having a low inertia high speed recording element with an inherent analog to digital conversion of a recorded signal.

A further object of the present invention is to provide an improved electrostatic recorder, as set forth herein, having a simple operation and construction.

In accomplishing these and other objects, there has been provided, in accordance with the present invention, an electrostatic recorder having a driven tape with a hole to admit recording powder from a powder reservoir to a recording surface. The tape is laterally disposed across the recording surface to allow the powder to record from one side of the surface to the other. A heating element is used to fuse the recording powder on the surface. The tape is driven by a drive system using prerecorded position identifying signals on the tape to derive a feedback reference signal. The reference signal is compared by a comparator with an input signal to be recorded, and the tape is driven by a motor means responsive to the comparator until an equality between the compared signals is reached.

A better understanding of the present invention may be had when the following detailed description is read in connection with the accompanying drawings in which:

FIG. 1 is a pictorial representation of a recorder embodying the present invention.

FIG. 2 is a partial top view of the recorder shown in FIG. 1.

FIG. 3 is a cross-section of the recording powder drum used in the recorder shown in FIG. 1.

Referring to FIG. 1 in more detail, there is shown a recorder embodying the present invention. While the mechanical features of the recorder are the subject of a copending application, Ser. No. 413,728, filed on Nov. 25, 1964, by Roger K. Strong, they will be described in detail here to insure clarity. A record strip 1 is disposed between a supply roll 2 and storage roll 3. The storage roll 3 is arranged to be rotatably driven by a roll motor 4 through a drive shaft 5 connected to the roll 3. A power take-off pulley 6 is mounted on the shaft 5. A drive belt 7 is disposed on the pulley 6 and a driven pulley 8 to drive the pulley 8 by means of the motor 4. The pulley 8 is mounted on a shaft 9 which is connected to a distributing drum 10.

The drum 10 is mounted within an enclosure 11 having a longitudinal slit 12. One end of the enclosure 11 is shown open in FIG. 1 for purposes of illustration but would normally be closed with provision for allowing the shaft 9 to pass therethrough. A chart printing dielectric powder 14 having thermo-setting characteristics; e.g., pulverized opaque polyethylene, is carried within the enclosure 11 and adjacent to the drum 10.

An endless inelastic belt 15 of electrically insulating material is arranged between the slit 12 and the chart 1 with the face surface of the belt 15 being parallel to the chart 1. The face of the belt 15 is arranged to have a width substantially greater than the slit 12 and is aligned to cover the slit 12. A section of the face of the belt 15 adjacent to the slit 12 and a length greater than the slit 12 is provided with a metallized surface 16. A hole 17 of suitable diameter is provided in the belt 15 substantially in the center of the metalized section 16 and aligned with the slit 12. While, for purposes of illustration, the slit 12, belt 15 and chart 1 have been shown in a spaced-apart relationship, these elements are actually very close together to allow the belt 15 to effectively seal the slit 12 except in the area of the hole 17 while the chart 1 is positioned behind the belt 15 to prevent a blurring, or spreading of the record line 20. This relationship may be seen more accurately in the pictorial representation shown in FIGS. 2 and 3.

The chart 1 is supported on its back surface in the vicinity of the belt 15 by a heated backing plate 21 which is also more clearly shown in FIG. 2. The belt 15 is disposed in an endless loop configuration between a pair of rollers 22 and 23. A power supply 24 is provided to electrostatically charge the powder 14 and the plate 21 to provide the driving force for attracting the powder to the chart 1. The negative lead from the power supply 24 is connected to the enclosure 11 and to the metalized section 16. The connection to the belt section 16 is made by a pair of brushes 25 which are arranged to have at least one brush always in contact with the belt section 16. The positive lead from the supply 24 is connected to the backing plate 21 to provide an electrostatic attraction for the negatively-charged powder 14 to the surface of the chart 1.

The drive for the belt 15 is produced by driving one of the rollers 22, 23; e.g., roller 23. The roller 23 is arranged to be driven by a recording drive system to provide a record on the chart 1 of an input signal applied to a pair of input terminals 27. This input signal is applied to a signal comparator 28 to be compared with a feedback signal representative of the position of the hole 17. This feedback signal is derived from the back leg of the belt 15 passing behind the chart 1. The surface of the back leg of the loop is provided with a magnetic recording surface having a succession of digital signals recorded thereon. These recorded digital signals are arranged to uniquely identify each incremental position of the hole 17 from one edge of the chart 1 to the other edge. A playback device 30 is provided to read the recorded core signals on the belt 15 to provide a representation of the position of the hole 17. The output signal from the playback means 30 is converted by a feedback signal converter 31 to a signal suitable for use by the comparator 28; e.g., digital to analog conversion. The output signal from the comparator 28 which is indicative of an error, or difference, between the input signal and feedback signal is applied to a motor 35 to drive the roller 23 and, consequently, the hole 17.

As shown in FIG. 2, a heater element 36 is provided on the backing plate 21 to fuse the powder 14 on the chart 1 to form a permanent recording. The heater 36 is energized by a heater supply 37.

In operation, the motor 4 is arranged to wind the recording strip 1 on the take-up roll 3 as the strip 1 is unwound from the supply roll 2. In addition, the motor 4 is operative to drive a cylindrical drum 10 within a recording powder housing 11. The drum 10 is positioned behind a slit 12 in the housing 11 to distribute the recording powder 14 behind the slit 12. The powder 14 is electrostatically charged by the power supply 24 which is connected to the housing 11. The metalized portion 16 of the tape 15 is arranged to face the slit 12 and is charged to the same polarity as the powder 14 from the supply 24 by brushes 25. Thus, the powder 14 is repelled from the surface 16 and is, consequently, restrained in the housing 11. However, a hole 17 is provided through the surface 16 and tape 15 to allow the powder 14 to be attracted past the tape 15. The length of the surface 16 is arranged to insure that it is always in front of the slit 12 for the maximum of tape 15.

The attraction of the powder 14 past the tape 15 through the hole 17 is effected by electrostatically polarizing the strip 1 to the opposite polarity from the powder 14. This polarization is achieved by passing the recording chart 1 over a supporting metal plate 21 arranged in contact with the back surface of the chart 1. The metal plate 21 is connected to the other side of supply 24 from the housing 11. The front surface of the recording strip 1 is arranged behind the tape 15 as the strip 1 is fed from roll 2 to roll 3. Thus, the powder 14 is attracted to the electrostatically charged strip 1 through the hole 17. A heating element 36 energized by supply 37 is operative to heat the plate 21 and strip 1 in the vicinity of the hole 17. The heated strip 1 is effective to set, or coalesce, the thermo-plastic powder on the recording surface of the strip 1. Thus, the powder 14 is formed into a permanent recording 20 on the strip 1. The rotation of the drum 10 is effective to insure that the slit 12 is provided with the recording powder 14 for immediate transfer through the hole 17 to the strip 1. The tape 15 and hole 17 are driven across the recording surface of the strip 1 by motor 35 which is arranged to be energized to produce a recording of input signals applied to input terminals 27. A selectively actuated shutter means may be provided between the strip and the slit 12 on either side of the belt 15 whereby to prevent any recording during a stoppage of the recording strip without turning off the supply 24. The shutter would extend the length of the slit 12 and would be charged to the same polarity as the powder 14 to completely retain the powder 14 within the housing 11. The shutter could be actuated by any suitable means to move rapidly from a slit blocking position to a non-blocking position and vice versa. Since it would remain charged to the same polarity as the powder 14, the shutter would not collect any of the powder 14 to interfere with the normal recording process. The drive system for the tape 15 operates as follows:

The recorder drive of the present invention is effective to position the hole 17 in response to variations of the input signal applied to input terminals 27. This input signal is compared by comparator 31 with a feedback reference signal derived from a hole position sensing device using a prerecorded magnetic signal on the tape 15 which tape is driven by motor 35. The tape 15 carries the recording hole 17 so that any motion of the tape 15 is shown as a representation 20 on the chart 1. The back loop of the tape 15 may be coated with a conventional magnetic recording surface which extends along the tape 15 for a distance substantially identical with the range of travel of the hole 17 on the chart 1. Thus, as the hole 17 moves from one edge of the chart 1 to the other edge thereof, a prerecorded signal is always beneath the playback device 30. The playback device 30 is a suitable magnetic transducer having static field responsive capabilities as well as an ability to sense a magnetic signal on a recording tape; i.e., a flux responsive head. The signals on the prerecorded section of the tape 15 are arranged to provide a unique signal from the playback device 30 for each incremental section of the recorded tape surface. For example, the recording may be a binary code on a multi-track recording having a suitable maximum binary code magnitude to cover the range of tape travel. In this case, the playback device 30 would be a multi-channel transducer having a plurality of magnetic heads to respond to respective channels on the tape 15. As the recorded surface on the tape 15 is scanned by the playback device 30, the binary code would be arranged to increase from one end of the recorded surface corresponding to one side of the chart 1 and a minimum input signal to a maximum value at the other end of the recorded surface corresponding to the other side of the chart 1 and a maximum input signal.

The sensed binary code signal from the playback device 30 is applied to a converter 31 for binary to analog conversion operation whereby an analog signal is derived having a magnitude corresponding to the binary code signal. It is to be noted that, since a binary, or digital, representation of the hole position and, hence, the magnitude of the input signal is available at the output of the playback device 30, this digital signal may be applied to appropriate devices such as a digital computer, automatic typewriter, paper punch, etc. for a further processing thereof. Since the binary code on the recorded section of the tape 15 is recorded with a high recording density, a change in the binary code may represent, a one-hundredth of an inch or less of movement of the tape 15. Thus, the change in magnitude of the output signal from the converter 31 is representative of incremental movements of the tape 15. The analog output signal from the converter 31 is applied to the comparator 28 to be compared with the input signal at the input terminals 27. The comparator 28 is effective to compare the input signals thereto and to produce an output signal having a magnitude representative of the difference, or error, and a polarity indicative of the direction of the error; i.e., is the input signal larger or smaller than the feedback reference signal. This output signal is applied to motor 35 which motor is arranged to drive the tape 15 by means of roller 23.

The polarity of the error signal from the comparator 28 is effective to energize the motor 35 to produce a motion of the tape 15 whereby to reduce the error signal. Thus, the motor 35 is energized to drive the tape 15 to either increase or decrease the analog output signal from the converter 31 to produce an equality between the feedback reference signal and the input signal on input terminals 27. The magnitude of the error signal is effective to produce a rapid motion of the tape 15 for a large error and to diminish the speed of the tape 15 as the error is reduced. When the difference between the reference signal and the input signal is reduced to a substantially zero magnitude, the motor 35 is stopped and the playback device 30 continues to sense the stationary binary code signal on the tape 15 to enable to comparator 28 to continuously make a comparison with the input signal. If the input signal again changes in magnitude, the comparator 28 would immediately produce an error signal to reenergize the motor 35 and drive the tape 15 and hole 17 to a new position which will produce a feedback reference signal to balance the input signal. The aforesaid movements of the inelastic tape 15 are, of course, reproduced on the chart 1 by the hole 17 and powder 14 to provide a record of the variations in the magnitude of the input signal applied to 27. Inasmuch as the inertia of the tape 15 is very low, the recorder drive system of the present invention is effective to accurately follow rapid changes in the magnitude of the input signal. It is to be noted that the recorded signal on the tape 15 indicative of the incremental position of the tape 15 and hole 17 may be arranged in a nonlinear fashion to adapt the recorder to an inherent linear recording of nonlinear input signals; e.g., thermocouple signals. Thus, the non-linear recording would be arranged to follow the non-linear curve of the input signal while producing linear movements of the hole 17 on the chart 1. If a suitable number of recording tracks and playback devices were used, the recorder could be used interchangeably between linear and non-linear input signals by having a switch means to control the output signals from the playback device 30 by selecting either magnetic head signals from the linear record tracks or the non-linear record tracks on the tape 15.

Accordingly, it may be seen that there has been provided, in accordance with the present invention, an improved electrostatic recorder having a novel feedback reference signal apparatus for use in a drive control system to drive the recording element of the recorder with the recorder having inherent capabilities for linearization of non-linear input signals and digital representation of the position of the recording element to operate associated digital devices.

What is claimed is:

1. An electrostatic recorder comprising a container for an electrostatically chargeable recording material, said container having a longitudinal slit therein, a recording medium, a web member disposed between said slit and said recording medium and arranged to cover said slit, said web member having a hole therein aligned with said slit, electrostatic charging means connected to said container and said recording medium and operative to charge said container and said recording medium to opposite polarities for attracting said recording material to said recording medium through said hole, motor means arranged to provide a bidirectional movement of said web to effect a motion of said hole across said recording medium, a prerecorded succession of information signals on a portion of said web member, signal responsive means arranged to read said information signals to provide varying magnitude output signals representative of the position of said hole with respect to said recording medium, input signal means arranged to be connected to a source of an input signal to be recorded, signal comparator means connected to said input signal means and said output signals from said responsive means and operative to provide an error signal suitable for driving said motor means to effect a substantial equality between said output signal from said response means and an input signal from said input signal means.

2. An electrostatic recorder as set forth in claim 1 wherein said web member is arranged in an endless loop configuration and said hole is in one leg of said loop while said information signals are recorded on the other loop leg.

3. An electrostatic recorder as set forth in claim 1 wherein said web member includes a longitudinal magnetic recording surface for recording said information signals and said responsive means includes a magnetic flux responsive reading head.

4. An electrostatic recorder as set forth in claim 1 wherein said prerecorded information signals are a succession of binary coded signals having an increasing magnitude from one end of the recording to the other to uniquely identify each incremental position of said web member.

5. An electrostatic recorder as set forth in claim 1 wherein said web member includes a plurality of longitudinal magnetic recording tracks and said responsive means includes a plurality of magnetic flux responsive heads associated with respective recording tracks, said prerecorded information being recorded linearly in a first group of recording tracks and non-linearly in a second group of recording tracks and said responsive means includes means for selectively providing output signals from said first and second group of recording tracks.

6. An electrostatic recorder as set forth in claim 2 wherein said web member in said other loop leg includes a magnetic recording surface for recording said information signs and said responsive means includes a magnetic flux responsive reading head, said prerecorded information signals being recorded as a succession of binary coded signals having an increasing magnitude from one end of the recording to the other to uniquely identify each incremental position of said web member.

References Cited

UNITED STATES PATENTS

| | | | |
|---|---|---|---|
| 3,261,284 | 7/1966 | Lynott | 101—114 |
| 3,266,046 | 8/1966 | Boyd | 346—74 |

BERNARD KONICK, *Primary Examiner.*

L. J. SCHROEDER, *Assistant Examiner.*